United States Patent
Grauberger (10) Patent No.: US 11,808,621 B2
(45) Date of Patent: Nov. 7, 2023

(54) LOAD CELLS FOR PLUG HOLDER WEIGHT MEASUREMENT

(71) Applicant: MJNN LLC, South San Francisco, CA (US)

(72) Inventor: Kevin Grauberger, Laramie, WY (US)

(73) Assignee: MJNN LLC, South San Francisco, CA (US)

( * ) Notice: Subject to any disclaimer, the term of this patent is extended or adjusted under 35 U.S.C. 154(b) by 243 days.

(21) Appl. No.: 17/327,518

(22) Filed: May 21, 2021

(65) Prior Publication Data
US 2021/0364338 A1    Nov. 25, 2021

Related U.S. Application Data

(60) Provisional application No. 63/029,149, filed on May 22, 2020.

(51) Int. Cl.
| | |
|---|---|
| *A01G 9/02* | (2018.01) |
| *G01G 3/14* | (2006.01) |
| *G01G 19/414* | (2006.01) |
| *G01G 19/52* | (2006.01) |
| *G01G 21/23* | (2006.01) |
| *G01G 21/28* | (2006.01) |

(52) U.S. Cl.
CPC .............. *G01G 3/14* (2013.01); *A01G 9/023* (2013.01); *G01G 19/4144* (2013.01); *G01G 19/52* (2013.01); *G01G 21/23* (2013.01); *G01G 21/28* (2013.01)

(58) Field of Classification Search
CPC . A01G 3/14; A01G 9/023; G01G 3/14; G01G 19/4144; G01G 19/52; G01G 21/23; G01G 21/28
See application file for complete search history.

(56) References Cited

U.S. PATENT DOCUMENTS

| | | | | |
|---|---|---|---|---|
| 5,265,376 A * | 11/1993 | Less | ........................ | A01G 9/025 47/83 |
| 6,477,805 B2 * | 11/2002 | Ware | ...................... | A01G 9/023 47/83 |
| 6,615,542 B2 * | 9/2003 | Ware | ...................... | A01G 9/025 47/83 |
| 10,121,121 B1 * | 11/2018 | De Bonet | .............. | A47B 57/34 |
| 10,206,344 B2 * | 2/2019 | Bryan, III | .............. | A01G 9/023 |
| 10,660,283 B2 * | 5/2020 | Tidona | .................... | A01G 31/06 |
| 10,736,284 B2 * | 8/2020 | Baker | .................... | A01G 9/025 |
| 10,809,122 B1 * | 10/2020 | Danenberg | .............. | A47F 5/103 |
| 10,986,787 B2 * | 4/2021 | Klein | ...................... | A01G 31/06 |
| 11,089,744 B2 * | 8/2021 | Moffitt | .................... | A01G 9/029 |
| 2003/0047603 A1 * | 3/2003 | Lustenberger | ......... | G01G 21/24 177/25.17 |
| 2016/0135398 A1 * | 5/2016 | Mathieu | ................. | A01G 31/06 47/62 R |

(Continued)

*Primary Examiner* — Randy W Gibson
(74) *Attorney, Agent, or Firm* — Patterson + Sheridan, LLP (57) ABSTRACT

Embodiments of the present disclosure relate to apparatus for measuring various characteristics of an indoor agriculture system. In one embodiment, a plug holder weight measurement system includes a plant plug holder disposed in a grow tower and one or more load cells positioned and configured to detect a weight of a plug holder. The load cells may be compression-type, tension-type, torsion-type, or beam-type load cells and each may be integrated into the grow tower.

20 Claims, 9 Drawing Sheets

(56) References Cited

U.S. PATENT DOCUMENTS

| | | | |
|---|---|---|---|
| 2019/0231467 A1* | 8/2019 | Grimsley | A47B 88/988 |
| 2020/0236871 A1* | 7/2020 | Travaglini | A01G 31/06 |
| 2021/0400892 A1* | 12/2021 | Rouxel | A01G 9/249 |
| 2022/0322611 A1* | 10/2022 | Woolbright | A01G 9/025 |

* cited by examiner

LOAD CELLS FOR PLUG HOLDER WEIGHT MEASUREMENT

CROSS-REFERENCE TO RELATED APPLICATIONS

This application claims priority to U.S. Provisional Patent Application No. 63/029,149, filed May 22, 2020, the entirety of which is herein incorporated by reference.

BACKGROUND

Field

Embodiments of the present disclosure generally relate to indoor agriculture systems. More specifically, embodiments of the present disclosure relate to metrology systems for plants capsule weight measurement.

Description of the Related Art

Conventional agricultural practices have evolved rapidly over the twentieth century to what can now be considered a fast-moving high-tech industry. Global food shortages, climate change, a societal changes instigated a transition from manually implemented agriculture techniques toward advanced farming methods, such as mechanized and automated farming. While conventional agricultural practices often limit a farmer to one growing season, indoor farming can eliminate environmental constraints and increase crop production. Controlled environment agriculture, or indoor farming, often implements data processing technologies and many advances, such as crop yield and the like, can be gained by utilizing such technologies.

However, commercial scale controlled environment agriculture is still in its relative infancy when compared to conventional agricultural practices. Although there exists great potential for data collection and analysis of various aspects of controlled environment agriculture, such technologies are not well developed. For example, the ability to efficiently and accurately measure crop yields remains difficult even within controlled environment agriculture systems.

Accordingly, what is needed in the art are improved metrology apparatus and processes for controlled environment agriculture systems.

SUMMARY

In one embodiment, a plug holder weight measurement apparatus is provided. The apparatus includes a grow tower defining a volume therein, an opening formed in a first wall of the grow tower, a plug holder disposed within the opening and extending into the volume, and a beam-type load cell coupled to the first wall adjacent to the opening.

In another embodiment, a plug holder weight measurement apparatus is provided. The apparatus includes a grow tower defining a volume therein, an opening formed in a first wall of the grow tower, a plug holder disposed within the opening and extending into the volume; and a tension-type load cell coupled between the first wall and the plug holder within the volume.

In another embodiment, a plug holder weight measurement apparatus is provided. The apparatus includes a grow tower defining a volume therein, an opening formed in a first wall of the grow tower, a plug holder disposed within the opening and extending into the volume, and a tension-type load cell coupled between the first wall and the plug holder outside of the volume.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to apparatus for measuring various characteristics of an indoor agriculture system. In one embodiment, a plug holder weight measurement system includes a plant plug holder disposed in a grow tower and one or more load cells positioned and configured to detect a weight of a plug holder. The load cells are compression-type, tension-type, torsion-type, or beam-type load cells and each is integrated into the grow tower, depending upon the desired implementation.

Figure 1A:
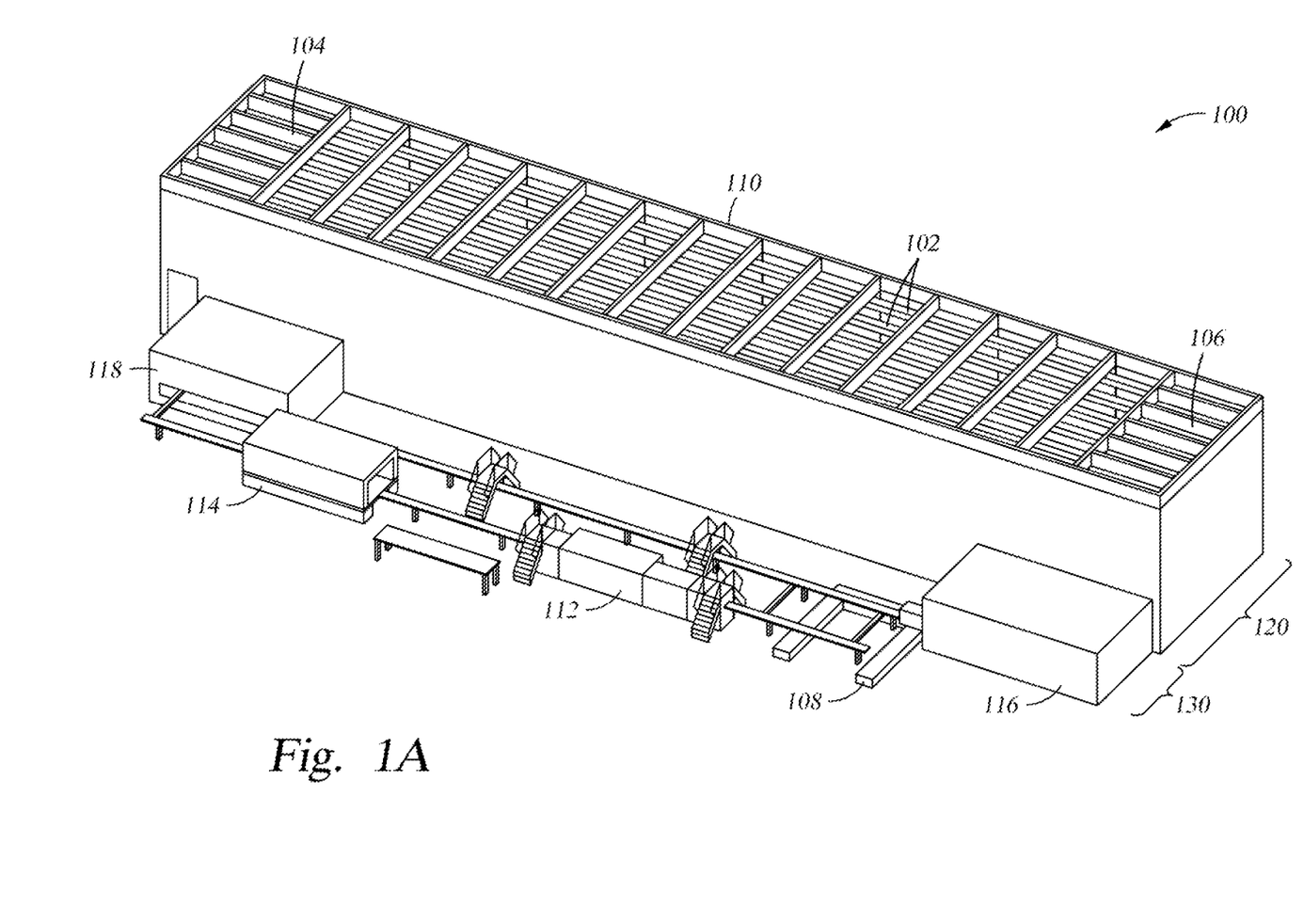
FIG. 1A illustrates a schematic perspective view of a controlled environment agriculture system according to an embodiment of the disclosure.
Figure 1B:
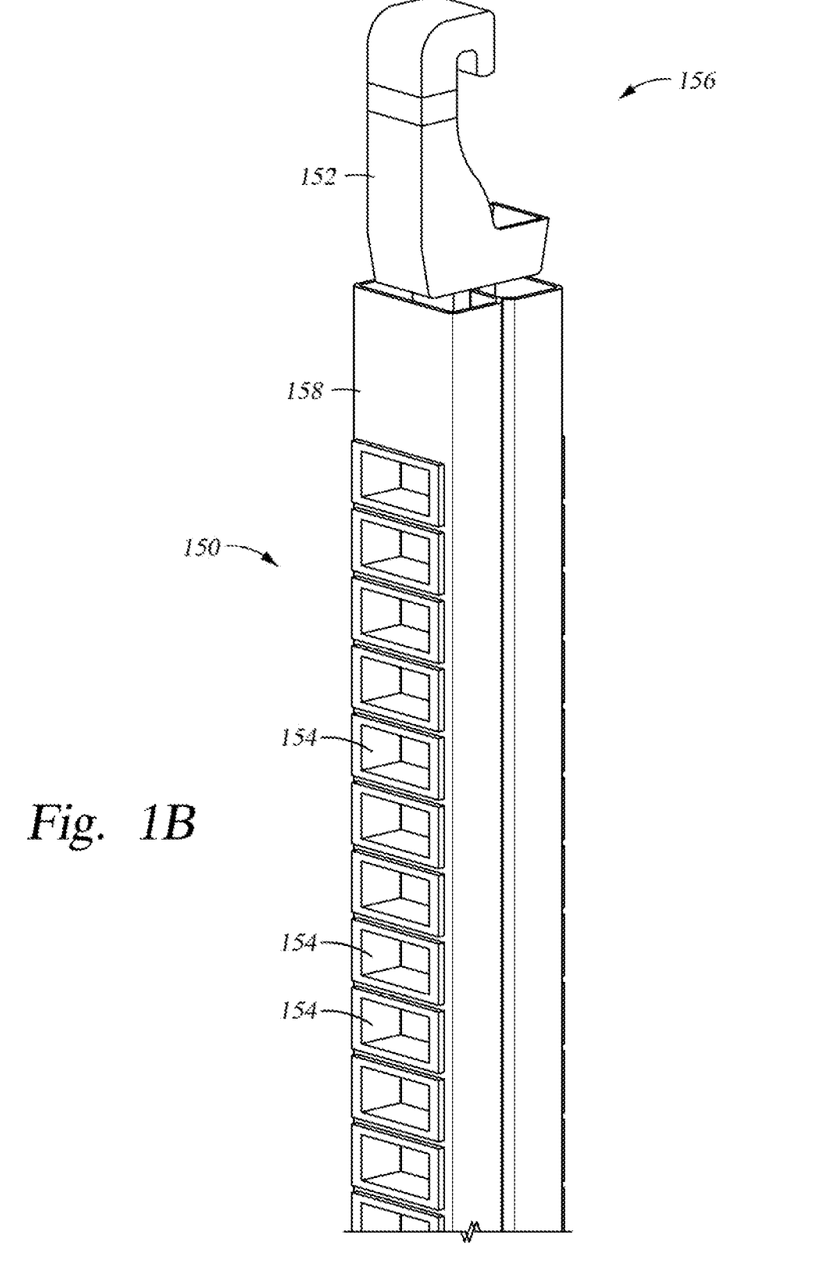
FIG. 1B illustrates a perspective view of a grow tower according to an embodiment of the disclosure.

FIG. 1 illustrates a schematic perspective view of a controlled environment agriculture system 100. The system 100 is configured for high-density growth and crop yield and includes an environmentally controlled growing chamber 120 and a vertical tower conveyance system 110 disposed within the growing chamber 120. The conveyance system 110 is operable to convey grow towers 150, described in greater detail with respect to FIG. 1B, with crops/plants therein through the growing chamber 120. The crops or plants grown within the system 100 exhibit gravitropic, geotropic, and/or phototropic growth characteristics. The crops or plants vary considerably and include, but are not limited to, leaf vegetables, fruiting vegetables, flowering crops, fruits, and tubers, among others. The system 100 is configured to grow a single crop or plant type at a time or grow multiple crop or plant types concurrently.

The system 100 also includes additional conveyance systems, such as a central processing system 130, for moving the grow towers in a circuit or pathway within the system 100 throughout the crop or plant growth cycle. The central processing system 130 includes one or more conveyance mechanisms for directing grow towers to stations for loading plant plugs into, and harvesting crops from, the grow towers. For example, the central processing system 130 includes a harvester station 108, a washing station, 112, and a transplanter station 114. The harvester station 108 removes crops from the grow towers and deposits harvested crops into food-safe containers which are then conveyed to post-harvest facilities (e.g. preparation, washing, packaging, storage, etc.).

In the illustrated embodiment, various stations of the central processing system 130 operate on grow towers disposed in a horizontal orientation. A pick-up station 118, and associated control logic, includes a robot operable to releasably grasp a grow tower oriented horizontally from a loading location, rotate the grow tower into a vertical orientation, and attach the grow tower to a transfer station for insertion into a selected grow line 102 of the growing chamber 120. At the other end of the growing chamber 120, a laydown station 116, and associated control logic, is operable to releasably grasp and move a vertically oriented grow tower from a buffer region, rotate the grow tower to a horizontal orientation, and position the grow tower on a conveyance system for loading into the harvester station 108. The stations 118, 116 each include a robotic arm, such as a six-degree of freedom robotic arm with end effectors for grasping the grow towers.

The growing chamber 120 also includes automated loading and unloading mechanisms for inserting grow towers into selected grow lines 102 and unloading grow towers from the grow lines 102. In one implementation, a load transfer conveyance mechanism 104 includes a powered and free conveyor system that conveys carriages loaded with grow towers from the pick-up station 118 to a selected grow line 102. The load transfer conveyance mechanism 104 also includes one or more actuators that push the grow towers onto a grow line 102. Similarly, an unload transfer conveyance mechanism 106 includes one or more actuators that push or pull the grow towers from the grow lines 102 into a carriage of another powered or free conveyor mechanism, which conveys the carriages from the grow line 102 to the laydown station 116.

The circuit or pathway includes a staging area for loading the grow towers into and out of the conveyance system 110. The conveyance system 110 within the growing chamber 120 is configured to suspend or otherwise support and translate one or more grow towers along a plurality of grow lines 102. Each grow tower is configured to contain plant growth media that supports a root structure of at least one crop or plant growing therein. The grow towers releasably attach to the grow lines 102 in a substantially vertical orientation and move along the grow lines 102 during a growth phase of the plant. The conveyance system 110 and central processing system 130 are arranged in a production circuit under the control of one or more computing and/or control systems.

The growing chamber 120 includes light emitting sources positioned at various locations along and between the grow lines 102 of the conveyance system 110. The light emitting sources can be positioned laterally relative to the grow towers in the grow lines 102 and configured to emit light toward faces of the grow towers that include openings from which the plants grow. In one example, the light emitting sources are light emitting diodes (LED). The light emitting sources are a plurality of LEDs arranged in a bar-like structure which is positioned in a vertical orientation to emit light laterally along an entire length of the grow tower. Multiple LED light bar structures are arranged in the growing chamber 120 along and between the grow lines 102. Other lighting configurations are also contemplated. For example, the LED light bar structures may be arranged horizontally between the grow lines 102. In certain embodiments, the LED light bar structures are water-cooled.

The growing chamber 120 also includes a nutrient supply system configured to supply an aqueous crop nutrient solution to the crops disposed in the grow towers as the grow towers translate through the growing chamber 120. A nutrient supply system provides an aqueous crop nutrient solution to a top of the grow towers and gravity causes the nutrient solution to travel down the vertically-oriented grow towers to the crops disposed along a length of the grow towers.

The growing chamber 120 also includes an airflow source which is configured to direct airflow in a direction lateral to growth of the crops and through an under-canopy of each plant to disturb a boundary layer of the under-canopy of the plant. In another implementation, airflow is directed from the top of the canopy or orthogonal to the direction of plant growth. The growing chamber 120 also includes a control system and associated sensors for regulating at least one growing condition, such as air temperature, airflow velocity, relative air humidity, and ambient carbon dioxide gas content. The control system further includes sub-systems such as HVAC units, chillers, fans, and associated ducting and air handling apparatus.

The grow towers include various identifying attributes, such as bar codes or radio frequency identification (RFID) tags, to enable sensing and location detection of each grow tower. The system 100 includes corresponding sensors and programming logic for tracking the grow towers during various stages of the crop production cycle and for controlling one or more conditions of the growth environment. The operation of the controls systems and the length of time the grow towers remain in the growth environment can vary depending on a variety of factors, such as crop type, desired crop maturity, and the like.

In operation, grow towers, with newly transplanted crops or seedlings disposed therein, are transferred from the central processing system 130 into the conveyance system 110. The conveyance system 110 moves the grow towers to predefined positions along respective grow lines 102 within the growing chamber 120 in a controlled manner. Within the growing chamber 120, the crops disposed in the grow towers are exposed to the controlled conditions of the growth environments, such as light, temperature, humidity, airflow, nutrient supply, etc. The control systems of the controlled environment agriculture system 100 are capable of automated adjustments to the growth environment to improve growing conditions and improve various crop attributes, such as crop yields, crop visual appeal, and crop nutrient content. When the crops are ready for harvesting, the grow towers are transferred from the conveyance system 110 to the central processing system 130 for harvesting and other processing operations.

FIG. 1B illustrates a perspective view of a grow tower 150 according to an embodiment of the disclosure. The grow tower 150 includes grow sites 154 for individual plants to grow within the system 100. As illustrated, a hook 152 is coupled to and end 156 of the grow tower 150. In one embodiment, the hook 152 is coupled to a top of the grow tower 150 when the end 156 is oriented vertically. The hook 152 enables the grow tower 150 to be supported by the grow lines 102 when the grow tower 150 is inserted into the conveyance system 110. The grow tower 150 has a substantially quadrilateral profile, such as rectangular or square, and a length of the grow tower 150 may be greater than about 3 meters, such as between about 5 meters and about 15 meters. The grow tower 150 is fabricated from a single piece of material or multiple sections of grow tower are coupled together to achieve a desired length of the grow tower 150.

The grow tower 150 includes a plurality of grow sites 154 distributed along a wall 158 of the grow tower 150. Although not illustrated, it is contemplated that grow sites 154 may also be distributed along faces of the grow tower 150 other than the wall 158, for example, walls of the grow tower 150 oriented normal to the wall 158. In operation, the transplanter station 114 transplants seedlings into empty grow sites 154 of the grow towers 150 where the seedlings remain and mature until the plant is ready for harvesting.

Figure 2A:
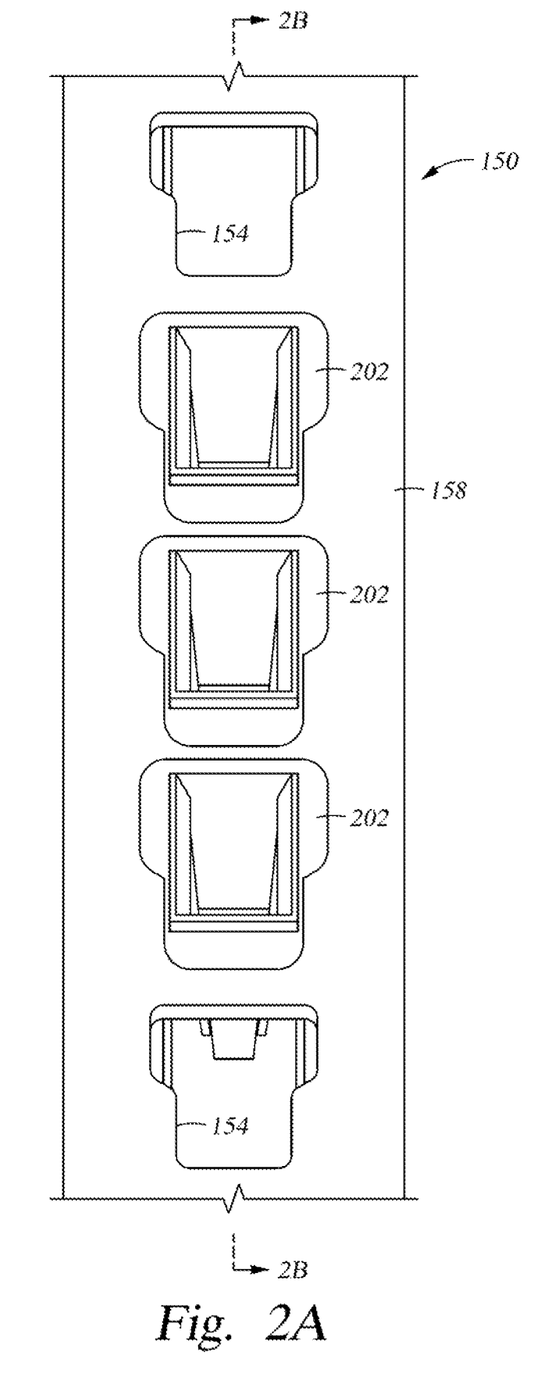
FIG. 2A is a side view of a grow tower with a plurality of plug holders disposed therein according to an embodiment of the disclosure.

FIG. 2A is a side view of the grow tower 150 with a plurality of plug holders 202 disposed therein according to an embodiment of the disclosure. As previously described, the grow tower 150 includes a plurality of openings 154 formed in the wall 158 of the grow tower 150. The openings 154 are sized, shaped, positioned, or otherwise oriented to accommodate and receive a plug holder 202 therein. In the illustrated embodiment, plug holders 202 are inserted in the middle three openings 154 and the uppermost and lowermost openings 154 are open without a plug holder 202 disposed therein. The illustrated embodiments do not show a plant (seedling or mature) contained within the plug holder 202, however, the plug holder 202 is configured to contain a seedling or mature plant therein when the plug holder is implemented within an operational agriculture system 100.

The plug holder 202, although illustrated with the grow tower 150, is not limited to use with a particular grow tower design and may be beneficially implemented with various grow tower designs. The grow sites 154 formed in the wall 158 are punched out, machined, or otherwise formed in the wall 158. The grow tower 150 is fabricated from a plastic material, for example, polyethylene, polypropylene, polyvinyl chloride (PVC), polytetrafluoroethylene, acrylonitrile butadiene styrene, or combinations thereof. In one embodiment, an opaque PVC material that is colored white is utilized to fabricate the grow tower 150. Using an opaque PVC material minimizes or prevents light from entering an interior of the grow tower 150 and helps to minimize or prevent algae blooms. The white colored plastic also increases an amount of light reflected back to plants growing within the grow tower 150.

Similar to the grow tower 150, the plug holder 202 is fabricated from a plastic material, for example, polyethylene, polypropylene, polyvinyl chloride (PVC), polytetrafluoroethylene, acrylonitrile butadiene styrene, or combinations thereof. The plug holder 202 is fabricated by injection molding in one embodiment, however, other suitable manufacturing techniques may also be utilized. The plug holder 202 may also be fabricated from an opaque plastic material (e.g. PVC) that is colored white to minimize algae blooms within the tower and to increase light reflectance.

Figure 2B:
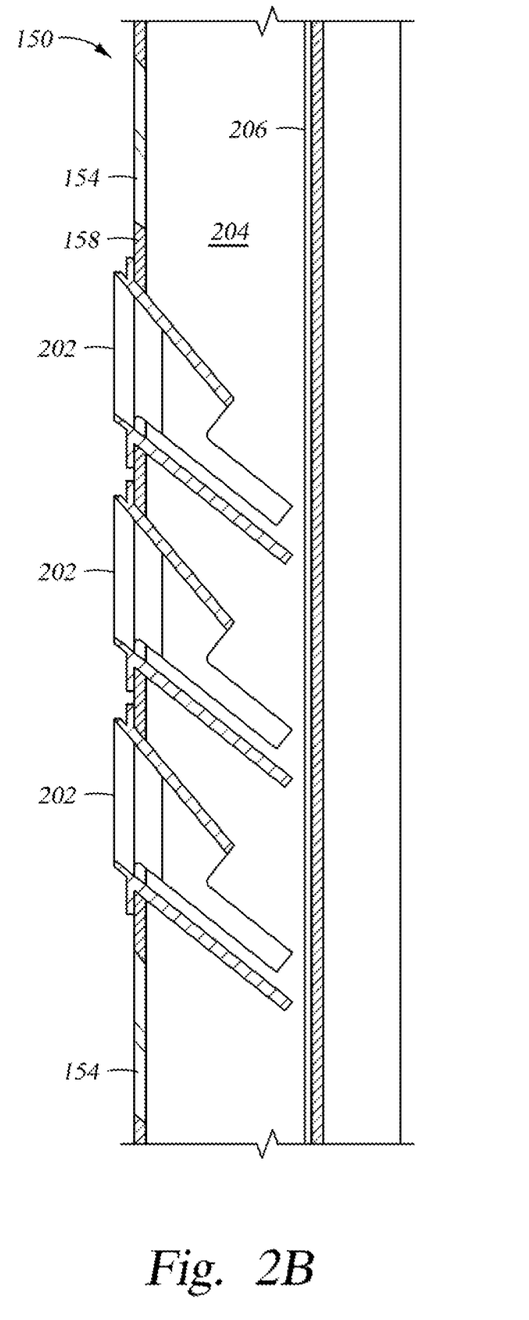
FIG. 2B is a cross-sectional view of the grow tower of FIG. 2A according to an embodiment of the disclosure.

FIG. 2B is a cross-sectional view of the grow tower 150 of FIG. 2A with the plug holders 202 disposed therein according to an embodiment of the disclosure. The plug holders 202 are positioned within the grow sites 154 and the plug holders 202 mount against the wall 158 of the grow tower 150. An interior volume 204 of the grow tower 150 is at least partially defined by the wall 158 and a wall 206 disposed substantially parallel to the wall 158. The wall 206 is disposed opposite the wall 158. In quadrilateral grow tower embodiments, additional sidewalls extend between the wall 158 and the wall 206 to define the volume 204. The plug holders 202 extend from the wall 158 into the volume 204 toward the wall 206. In one embodiment, the plug holders 202 extend from the wall 158 toward the wall 206 at a non-normal angle such that the plug holders 202 are disposed within the volume 204 at non-normal angles relative to a major axis of either the wall 158 or the inner surface 204.

Figure 3:
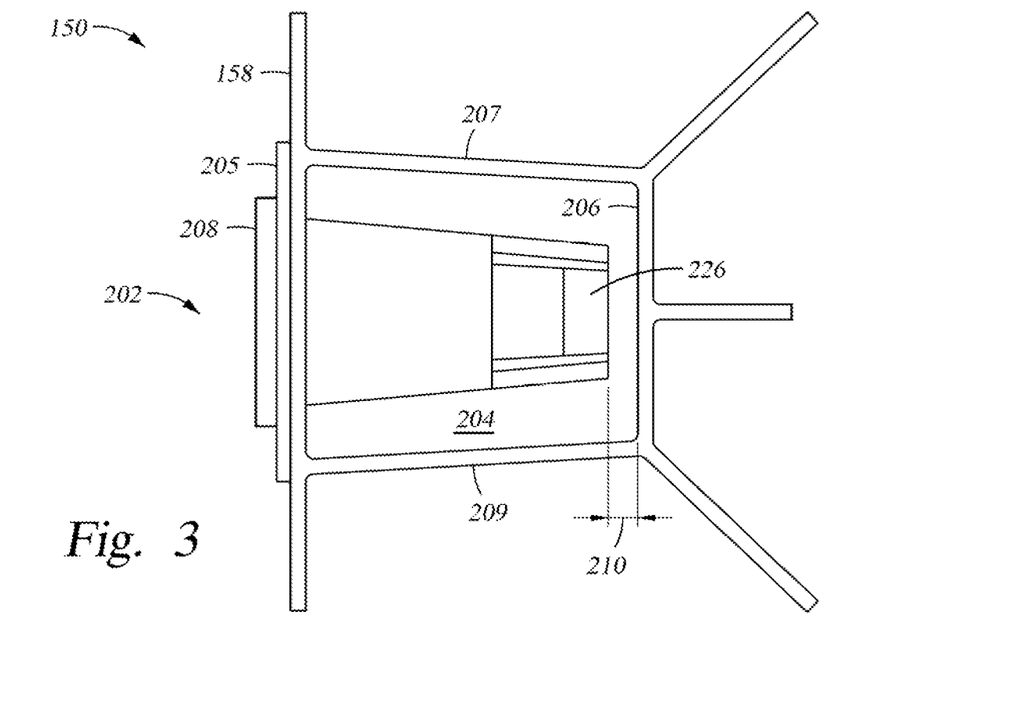
FIG. 3 illustrates a top plan view of the grow tower with plug holders disposed therein of FIG. 2A according to an embodiment of the disclosure.
Figure 4:
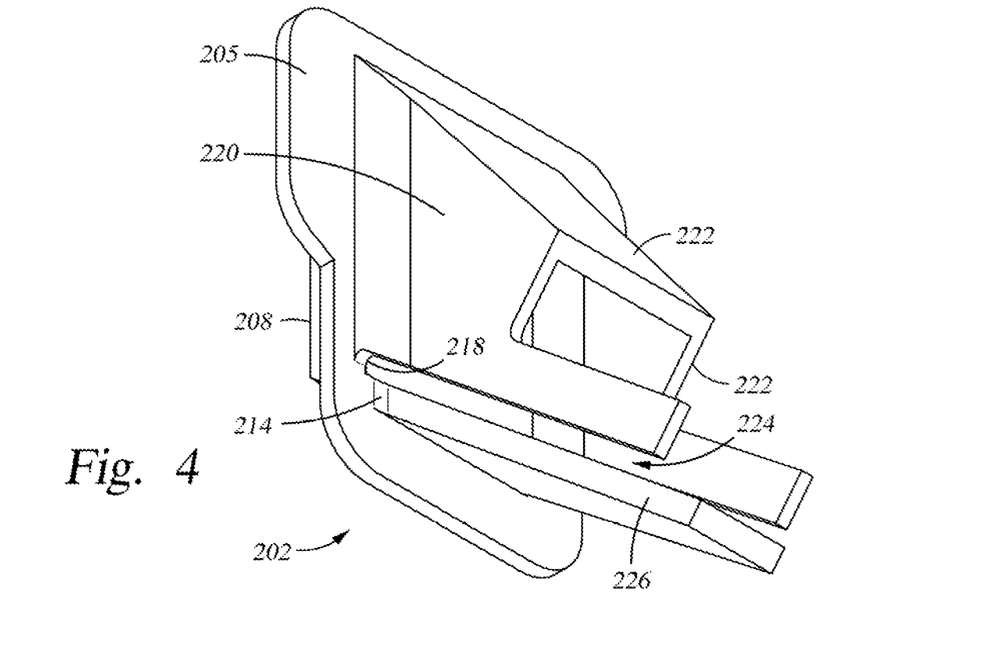
FIG. 4 illustrates a rear perspective view of a plug holder according to an embodiment of the disclosure.

FIG. 3 illustrates a plan view of the grow tower 150 with a plug holder 202 disposed therein according to an embodiment of the disclosure. FIG. 4 illustrates a perspective view of a backside of the plug holder 202. As described with regard to FIG. 2, a plurality of walls or surface define the inner volume 204 of the grow tower 150. In one example, the wall 158, the wall 206, and sidewalls 207, 209 substantially the inner volume 204. In one embodiment, the sidewalls 207, 209 are oriented substantially parallel to one another. Alternatively, the sidewalls 207, 209 are oriented at non-parallel angles with respect to one another. The sidewalls 207, 209 extend between the wall 158 and the wall 206.

The plug holder 202 is attached to the wall 158 via an edge member 205. The edge member 205 surrounds an opening of the plug holder 202 within which a plant is to be disposed. The edge member 205 extends outward and away from sides of the plug holder 202, which enables a back surface 503 of the edge member 205 to mate and/or seal against the wall 158 of the grow tower 150. Although the plug holder 202 seals against the wall 158, a perfect seal is not implemented in every embodiment. However, some amount of sealing, whether sufficient to provide a perfect liquid seal or not, may be implemented to prevent or minimize fluid loss out of the openings of the grow sites 154. In one embodiment, the edge member 205 is positioned against the wall 158, however, a seal is not formed to enable relative movement of the edge member 205, and thus the plug holder 202, relative to the wall 158.

Portions of the plug holder 202, including the edge member 205, are spaced apart from the wall 158 of the plug holder 202. In another embodiment, the opening of the grow site 154 may be oversized relative to the shape of the plug holder 202. For example, a relatively large tolerance may be employed such that when the plug holder 202 is disposed in the grow site 154, the plug holder 202 fits loosely within the grow site 154 of the grow tower 150. As described in detail herein, such a configuration enables integration with various metrology apparatus, such as load cells or the like, to detect various characteristics associated with plants disposed in the plug holders 202 or systems facilitating growth of the plants.

A front shroud 208 of the plug holder 202 extends outward and away from the edge member 205. In one embodiment, the front shroud 208 defines an opening of the plug holder 202 within which a plant is disposed. The front shroud 208 has a substantially square opening of approximately 1.25 in by 1.25 in. However, it is contemplated that various different geometries with different magnitudes may be implemented depending upon the type of plant being grown in the plug holder or various other characteristics associated with growth of the plant. For example, a rectangular opening, a circular opening, a polygonal opening or other shaped opening are contemplated.

The plug holder 202 includes a base member 226 which extends away from the edge member 205. The base member 226 supports the plant plug disposed therein and prevents or minimizes the probability of the plant plug from sagging as the plug becomes saturated with water or a nutrient solution. The base member 226 extends from the edge member 205 toward the wall 206. A distance 210 of separation between the base member 226 and the wall 206 is sized to accommodate potential movement of the base member 226 relative to the wall 206. In one embodiment, the distance 210 is less than about 2 in, for example, less than about 1 in, such as less than about 0.5 in, for example, about 0.1 in or less.

Depending upon the desired implementation, the distance 210 is sufficient to accommodate a load cell disposed between the base member 226 and the wall 206 or to enable some degree of movement of the base member 226 without contacting the wall 206. However, the distance 210 is not so great as to prevent or negatively impact uptake of water or nutrients by plants disposed in the plug holders 202. For example, water or nutrients may flow along the wall 206 or otherwise within the volume 204 and the roots of the plants may extend from the plug holder 202 to enable uptake by the plants.

A fillet 214 is disposed between the base member 226 and the edge member 205 to reduce stress of the base member 507 where the base member 226 is coupled to the edge member 205. A fillet 214 is also utilized between sides of the base member 226 and the edge member 205. The plug holder 202 includes a rear shroud 220 having a plurality of surfaces 222. The rear shroud 220 is coupled to the edge member 205 by a fillet 218 to reduce stress of the rear shroud 220 and extend the service life of the plug holder 202. The surfaces 222 are solid surfaces which taper from the edge member 205. The surfaces 222 also reduce the probability of leakage form the volume 204 through the grow sites 154 and help to reduce erosion of a plant plug disposed in the plug holder 202. Still further, the surfaces 222 provide structure adjacent to the plant plug which is utilized to improve root growth or water/nutrient flow.

An opening 224 is formed in the rear shroud 220 to enable the plant plug and/or roots to extend out of the plug holder 202. The opening 224 exposes the plant plug to water/nutrients and enables the roots to grow outward, thus reducing binding of roots within the plant plug. Because the plant plug typically includes soil or another growth medium, the opening 224 is tapered to compress the plant plug to prevent the plug from falling out of the opening 224 into the volume 204 of the grow tower 150. Various other plug holder designs, such as those disclosed in co-pending U.S. patent application Ser. No. 15/910,796, filed Mar. 2, 2018, may be implemented in accordance with the embodiments described herein to the extent that such implementations are not inconsistent with the present disclosure.

Figure 5:
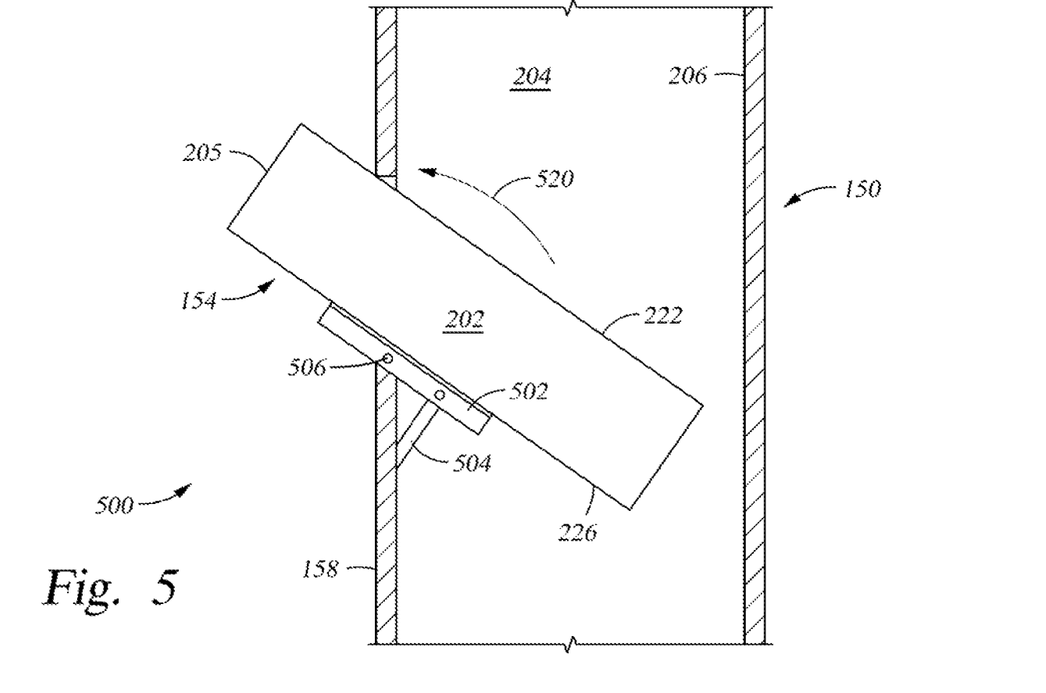
FIG. 5 illustrates a schematic, cross-sectional view of a plug holder weight measurement system according to an embodiment of the disclosure.

FIG. 5 illustrates a schematic, cross-sectional view of a plug holder weight measurement system 500 according to an embodiment of the disclosure. The system 500 includes the grow tower 150, the plug holder 202 disposed in the grow tower 150, and a load cell 502 configured to measure force applied to the load cell 502 by the plug holder 202. In one embodiment, the load cell 502 is a beam-type load cell. The load cell 502 may also be a hydraulic, pneumatic, piezoelectric, or strain gauge type load cell. The beam-type load cell is a beam, plate, rod, shaft, or other suitable shape, depending upon the desired implementation.

In one embodiment, the load cell 502 includes a strain gauge. In this embodiment, the load cell 502 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

In one embodiment, the load cell 502 is coupled to the wall 158 of the grow tower 150 by a fastener 506. The fastener 506 which couples the load cell 502 to the wall 158 is a bolt, bearing, bushing, or other suitable connecting apparatus. It is contemplated the fastener 506 is configured to position the load cell 502 relative to the wall 158 and maintain the load cell 502 in a substantially static position. A bracket 504 is coupled to the wall 158 with in the volume 204 below the plug holder 202. The bracket 504 is also coupled to the load cell 502. Similar to the fastener 506, the bracket 504 orients the load cell 502 in a fixed position. In one embodiment, the bracket 504 is optional. In this embodiment, the fastener 506 is sufficient to maintain the load cell 502 in a fixed position relative to the wall 158. In one embodiment, the base member 226 of the plug holder 202 is coupled to the load cell 502 by suitable fastening apparatus, such as screws, bolts, rivets, or the like. It is contemplated that the load cell 502 supports the entire weight of the plug holder 202 or a known percentage of the total plug holder weight.

In operation, the load cell 502 detects force 520 applied thereto by the plug holder 202. For example, as a plant disposed in the plug holder 202 grows, a center of mass of the plant extends out of the plug holder 202 beyond the edge member 205 and the weight of the plant, supported by the plug holder 202, exerts force upon the load cell 502. The load cell 502 may be utilized to measure a weight of individual plants disposed in the grow tower 150. For example, a total weight value sensed by the load cell 502 may include the weight of the plant, growth media, and the plug holder 202. The plug holder 202 has a known weight and is subtracted from the total weight to determine a weight of the plant and growth media. Such measurements of the plant growing in the plug holder 202 are utilized to determine plant growth rates, canopy density, maturity, moisture content of growth media, an various other characteristics which are utilized to improve plant growth management.

Figure 6:
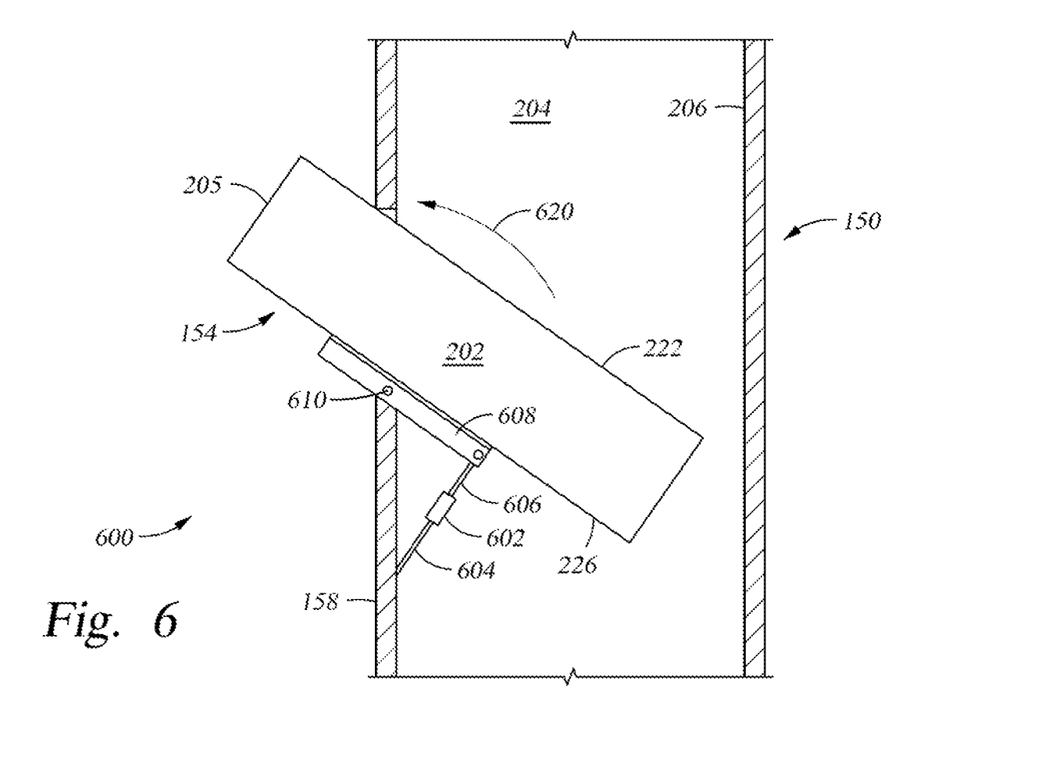
FIG. 6 illustrates a schematic, cross-sectional view of a plug holder weight measurement system according to an embodiment of the disclosure.

FIG. 6 illustrates a schematic, cross-sectional view of a plug holder weight measurement system 600 according to an embodiment of the disclosure. The system 600 includes the grow tower 150, the plug holder 202 disposed in the grow tower 150, and a load cell 602 configured to measure force applied to the load cell 602 by the plug holder 202. In one embodiment, the load cell 602 is a tension-type load cell. The load cell 602 may also be a hydraulic, pneumatic, piezoelectric, or strain gauge type load cell. Examples of suitable load cells include S-type tension load cells, tension link type load cells, canister type tension load cells, or pancake type tension load cells.

In one embodiment, the load cell 602 includes a strain gauge. In this embodiment, the load cell 602 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

In one embodiment, a support plate 608 is coupled to the wall 158 of the grow tower 150 by a fastener 610. The fastener 610 which couples the support plate 608 to the wall 158 is a bolt, bearing, bushing, or other suitable connecting apparatus. The plug holder 202 is positioned on the support plate 608. For example, the base member 226 of the plug holder 202 is disposed on and coupled to the support plate 608. The fastener 610 is configured to position the support plate 608 relative to the wall 158 and maintain the plug holder 202 in a substantially static position. It is contemplated that the support plate 608 supports the entire weight of the plug holder 202 or a known percentage of the total plug holder weight. In certain embodiments, the support plate 608 is optional.

In an embodiment utilizing the support plate 608, the load cell 602 is coupled between the support plate 608 and the wall 158 within the volume 204. For example, a first connector 604 is coupled between the wall 158 and the load cell 602 and a second connector 606 is coupled between the load cell 602 and the support plate 608. The connectors 606, 608 are structuring elements suitable to transmit force applied thereto to the load cell 602. The connectors 606, 608 are a wire, rope, line, rod, shaft, or the like fabricated from a material which exhibits little to no elasticity when subjected to directional force 620 applied by the weight of a plant in the plug holder 202.

In an embodiment where the support plate 608 is not utilized, the plug holder 202 is coupled directly to the wall 158. In this embodiment, the load cell 602 is coupled to the plug holder directly via the connector 606. For example, the connector 606 is coupled between the base member 226 of the plug holder and the load cell 602. Thus, the load cell 602 is capable of detecting force exerted thereon which is indicative of the weight of the plug holder 202 and the plant disposed in the plug holder 202.

Figure 7:
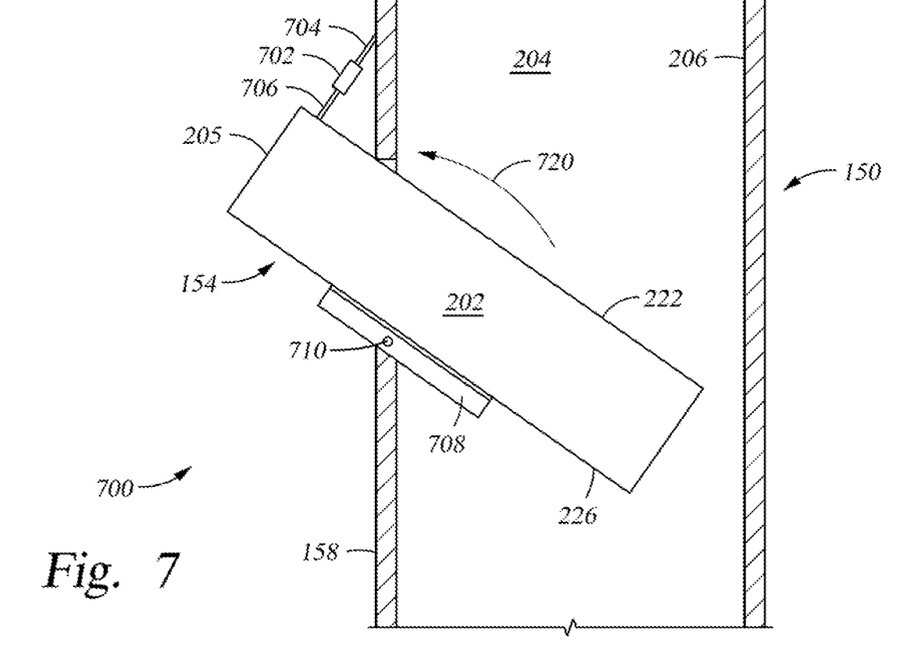
FIG. 7 illustrates a schematic, cross-sectional view of a plug holder weight measurement system according to an embodiment of the disclosure.

FIG. 7 illustrates a schematic, cross-sectional view of a plug holder weight measurement system 700 according to an embodiment of the disclosure. The system 700 includes the grow tower 150, the plug holder 202 disposed in the grow tower 150, and a load cell 702 configured to measure force applied to the load cell 702 by the plug holder 202. In one embodiment, the load cell 702 is a tension-type load cell. The load cell 702 may also be a hydraulic, pneumatic, piezoelectric, or strain gauge type load cell. Examples of suitable load cells include S-type tension load cells, tension link type load cells, canister type tension load cells, or pancake type tension load cells.

In one embodiment, the load cell 702 includes a strain gauge. In this embodiment, the load cell 702 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

In one embodiment, a support plate 708 is coupled to the wall 158 of the grow tower 150 by a fastener 710. The fastener 710 which couples the support plate 708 to the wall 158 is a bolt, bearing, bushing, or other suitable connecting apparatus. The plug holder 202 is positioned on the support plate 708. For example, the base member 226 of the plug holder 202 is disposed on and coupled to the support plate 708. The fastener 710 is configured to position the support plate 708 relative to the wall 158 and maintain the plug holder 202 in a substantially static position. It is contemplated that the support plate 708 support the entire weight of the plug holder 202 or a known percentage of the total plug holder weight.

In certain embodiments, the support plate 708 is optional. In embodiments where the support plate 708 is not utilized, the support plate 708 may be replaced with a torsion-type load cell. The torsion-type load cell is utilized to detect torsional forces about the fastener 710 to ultimately determine a weight of the plug holder 202. In this embodiment, the load cell 702 is optional. In another embodiment where the support plate 708 is replaced with a torsion-type load cell, an additional load cell is disposed in communication with the torsion-type load cell. In this embodiment, the torsion-type load cell is utilized to detect momentary forces and the additional load cell is utilized to detect forces applied in a vertical direction.

The load cell 702 is coupled between the plug holder 202 and the wall 158 outside of the volume 204. For example, a first connector 704 is coupled between the wall 158 and the load cell 702 and a second connector 706 is coupled between the load cell 702 and the surface 222 of the plug holder 202 located outside of the volume 204. The connectors 706, 708 are structuring elements suitable to transmit force applied thereto to the load cell 702. The connectors 706, 708 are a wire, rope, line, rod, shaft, or the like fabricated from a material which exhibits little to no elasticity when subjected to directional force 720 applied by the weight of a plant in the plug holder 202. Thus, the load cell 702 is capable of detecting force exerted thereon which is indicative of the weight of the plug holder 202 and the plant disposed in the plug holder 202.

Figure 8:
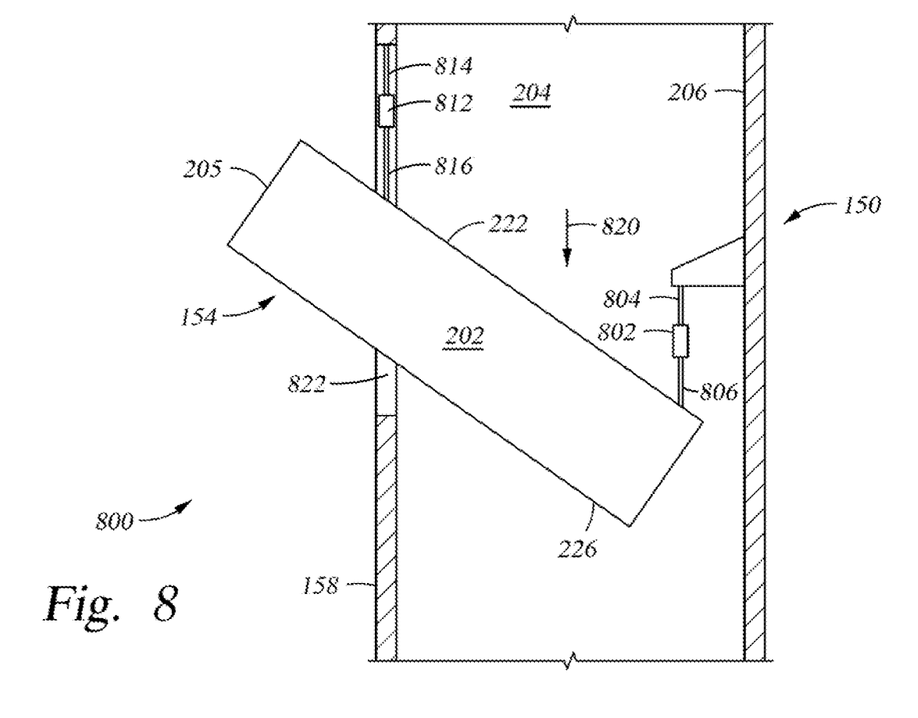
FIG. 8 illustrates a schematic, cross-sectional view of a plug holder weight measurement system according to an embodiment of the disclosure.

FIG. 8 illustrates a schematic, cross-sectional view of a plug holder weight measurement system 800 according to an embodiment of the disclosure. The system 800 includes the grow tower 150, the plug holder 202 disposed in the grow tower 150, and a plurality of load cells 802, 812 configured to measure force applied to the load cells 802, 812 by the plug holder 202. In one embodiment, the load cells 802, 812 are tension-type load cells. The load cells 802, 812 may also be a hydraulic, pneumatic, piezoelectric, or strain gauge type load cells. Examples of suitable load cells include S-type tension load cells, tension link type load cells, canister type tension load cells, or pancake type tension load cells.

In one embodiment, the load cells 802, 812 include a strain gauge. In this embodiment, the load cells 802, 812 include a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

A first load cell 802 is coupled between the plug holder 202 and a block 808. In one embodiment, the block 808 is a structuring element coupled to the wall 206 within the volume 204 and the block 808 extends from the wall 206 into the volume 204. Alternatively, the block 808 is an integral portion of the wall 206 which extends into the volume 204 toward the wall 158. In one embodiment, the block 808 is positioned above the surface 222 of the plug holder 202. A first connector 804 is coupled between the block 808 and the load cell 802 and a second connector 806 is coupled between the load cell 802 and the surface 222 of the plug holder 202. The connectors 804, 806, are similar to the connectors 604, 606.

A second load cell 812 is coupled between the plug holder 202 and the wall 158. A third connector 814 is coupled between the wall 158 and the load cell 812 and a fourth connector 816 is coupled between the load cell 8012 and the surface 222 of the plug holder 202. The connectors 814, 816 are similar to the connectors 804, 806. The load cells 802, 812 and connectors 804, 806, 814, 816, respectively, support the weight of the plug holder 202 and a plant disposed therein. In another embodiment, a third load cell 822 forms a portion of the wall 158 defining the grow site opening 154. In this embodiment, the third load cell 822 is a compression type load cell. Depending upon the desired implementation, the third load cell 822 is utilized alone or in conjunction with one or both of the load cells 802, 812.

Because the load cells 802, 812 have the directional force 820 of the weight of the plug holder 202 and the plant exerted thereon and the load cells 802 are coupled to opposing ends of the plug holder 202, additional metrology data may be revealed. For example, the difference in measured values between the load cells 802, 812 may be utilized to determine a location of a center of mass of the plant relative to the wall 158. In this example, the difference in measured values is a measurement of torque. In other examples, the first load cell 802 may provide weight data which is more sensitive to soil moisture or the water/nutrients contained in the roots or growth media and the second load cell 812 may provide weight data that is more sensitive to plant maturity due to the respective coupling locations of the load cells 802, 812 on the plug holder 202.

Figure 9:
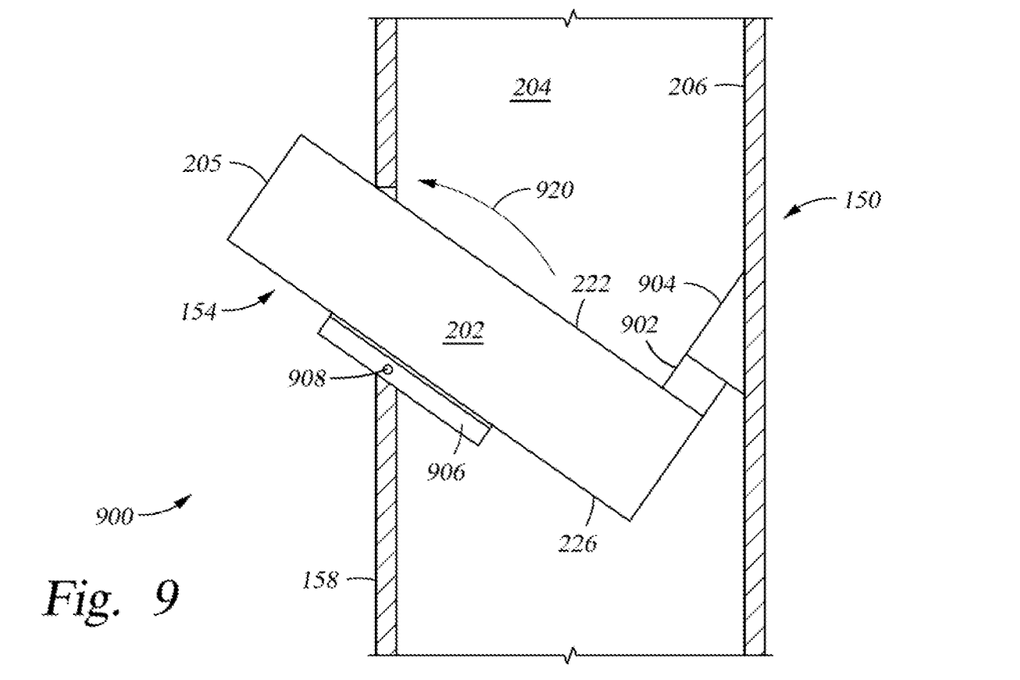
FIG. 9 illustrates a schematic, cross-sectional view of a plug holder weight measurement system according to an embodiment of the disclosure.

FIG. 9 illustrates a schematic, cross-sectional view of a plug holder weight measurement system 900 according to an embodiment of the disclosure. The system 900 includes the grow tower 150, the plug holder 202 disposed in the grow tower 150, and a load cell 902 configured to measure force applied to the load cell 902 by the plug holder 202. In one embodiment, the load cell 902 is a compression-type load cell. The load cell 902 may also be a hydraulic, pneumatic, piezoelectric, or strain gauge type load cell. Examples of suitable load cells include S-type compression load cells, canister type compression load cells, or pancake type compression load cells.

In one embodiment, the load cell 902 includes a strain gauge. In this embodiment, the load cell 902 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

In one embodiment, the load cell 902 is coupled between the plug holder 202 and a block 904. The block 904 is a structuring element coupled to the wall 206 within the volume 204 and the block 904 extends from the wall 206 into the volume 204. Alternatively, the block 904 is an integral portion of the wall 206 which extends into the volume 204 toward the wall 158. In one embodiment, the block 904 is positioned above at least a portion of the surface 222 of the plug holder 202. Directional force 920 exerted on the load cell 902 from weight of a plant growing beyond the edge member 205 of the plug holder 202 causes the load cell 902 to be compressed against the block 904. As such, the weight of the plug holder 202 and/or the plant disposed therein is detected by the load cell 902.

In an optional embodiment, a support plate 906 is coupled to the wall 158 by a fastener 908. In one embodiment, the support plate 906 is also coupled to the base member 226 and support and position the plug holder 202 in a predetermined orientation relative to the wall 158. For example, the support plate 906 may be optionally utilized to provide additional structural rigidity at the interface between the plug holder 202 and the wall 158.

Figure 10:
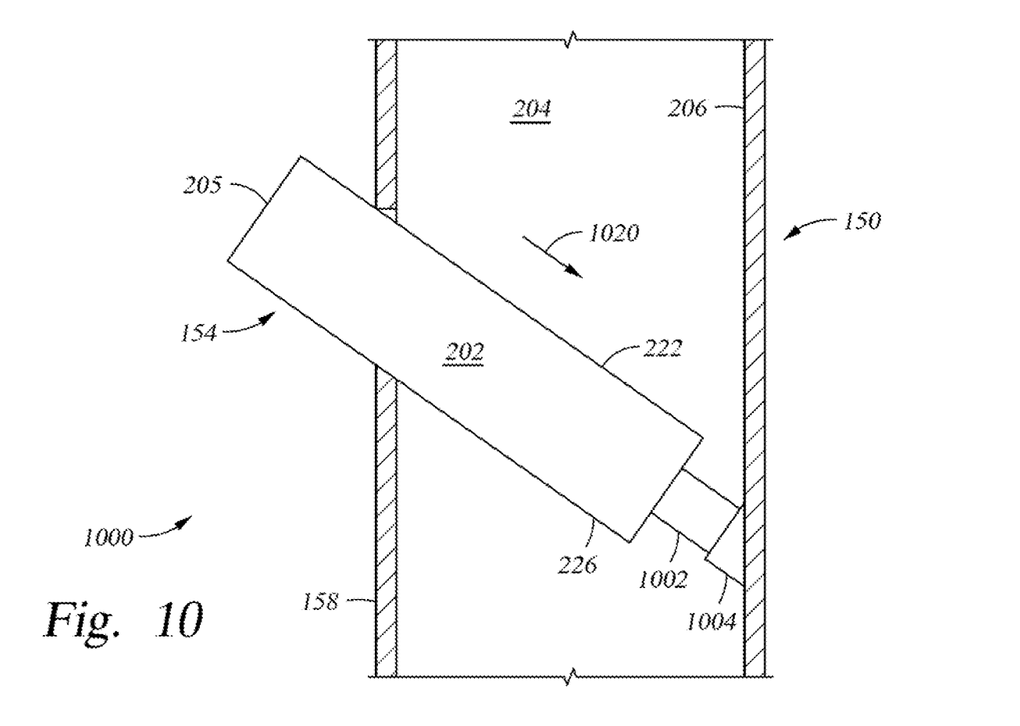
FIG. 10 illustrates a schematic, cross-sectional view of a plug holder weight measurement system according to an embodiment of the disclosure.

FIG. 10 illustrates a schematic, cross-sectional view of a plug holder weight measurement system 1000 according to an embodiment of the disclosure. The system 1000 includes the grow tower 150, the plug holder 202 disposed in the grow tower 150, and a load cell 1002 configured to measure force applied to the load cell 1002 by the plug holder 202. In one embodiment, the load cell 1002 is a compression-type load cell. The load cell 1002 may also be a hydraulic, pneumatic, piezoelectric, or strain gauge type load cell. Examples of suitable load cells include S-type compression load cells, canister type compression load cells, or pancake type compression load cells.

In one embodiment, the load cell 1002 includes a strain gauge. In this embodiment, the load cell 1002 includes a metallic body which exhibits minimal elasticity which can be considered a spring element. As force is exerted on the metallic body, the spring element of the body is deformed. A strain gauge, which may be a wire or foil, typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the plug holder 202.

In one embodiment, the load cell 1002 is coupled between the plug holder 202 and a block 1004. The block 1004 is a structuring element coupled to the wall 206 within the volume 204 and the block 1004 extends from the wall 206 into the volume 204. Alternatively, the block 1004 is an integral portion of the wall 206 which extends into the volume 204 toward the wall 158. In one embodiment, the block 1004 is positioned below at least a portion of the surface 222 of the plug holder 202. Directional force 1020 exerted on the load cell 1002 from weight of a plant growing within the plug holder 202 causes the load cell 1002 to be compressed against the block 1004. As such, the weight of the plug holder 202 and/or the plant disposed therein is detected by the load cell 1002.

Figure 11:
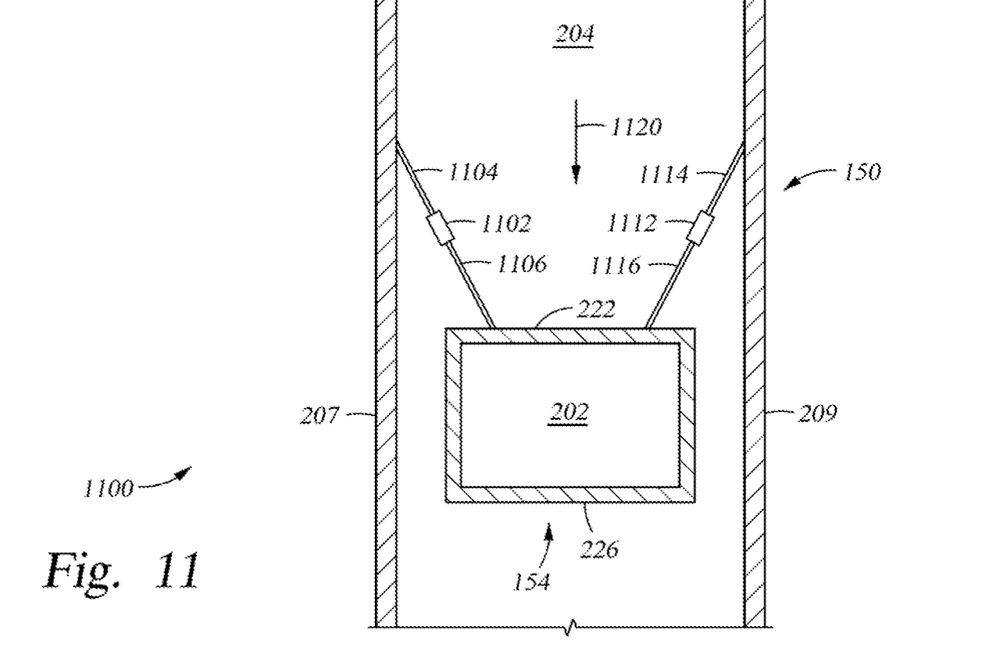
FIG. 11 illustrates a schematic, cross-sectional view of a plug holder weight measurement system according to an embodiment of the disclosure.

FIG. 11 illustrates a schematic, cross-sectional view of a plug holder weight measurement system 1100 according to an embodiment of the disclosure. The illustrated embodiment depicts a cross-sections The system 1100 includes the grow tower 150, the plug holder 202 disposed in the grow tower 150, and a plurality of load cells 1102, 1112 configured to measure force applied to the load cells 1102, 1112 by the plug holder 202. In one embodiment, the load cells 1102, 1112 are tension-type load cells such as those described in detail with regard to FIGS. 6, 7, and 8.

A first load cell 1102 is coupled between the plug holder 202 and the sidewall 207 of the grow tower 150 by a plurality of connectors 1104, 1106. For example, a first connector 1104 is coupled between the sidewall 207 and the first load cell 1102 and a second connector 1106 is coupled between the first load cell 1102 and the plug holder 202. The first connector 1104 is coupled to the sidewall 207 above the grow site opening 154 formed in the wall 158 (not shown). A second load cell 1112 is coupled between the plug holder 202 and the sidewall 209 of the grow tower 150 by a plurality of connectors 1104, 1106. For example a third connector 1114 is coupled between the sidewall 209 and the second load cell 1112 and a fourth connector 1116 is coupled between the second load cell 1112 and the plug holder 202. Similar to the first connector 1104, the third connector 1114 is coupled to the sidewall 209 above the grow site opening 154 formed in the wall 158 (not shown).

The second connector 1106 and fourth connector 1116 couple to the plug holder surface 222 and the points at which the connectors 1106, 1116 couple to the surface 222 are spaced apart from one another. The spacing of the connection points of the connectors 1106, 1116 stabilizes the plug holder 202 within the volume 204 and is believed to reduce torqueing of the plug holder 202 relative to the wall 158 through which the plug holder 202 is disposed. The load cells 1102, 1112 detect directional force 1120 applied thereto which is representative of the weight of the plug holder 202 and/or the plant growing in the plug holder 202.

It is believed that by utilizing multiple load cells (e.g. load cells 1102, 1112), weight measurements may be obtained with a greater degree of accuracy. For example, if the load cells 1102, 1112 detect different weight values beyond predetermined standard of error, this data may be utilized to identify potential problems with the plug holder 202 and/or the plant growing in the plug holder 202. Moreover, additional support points enabled by the utilization of multiple load cells 1102, 1112 and the respective connectors 1104, 1106, 1114, 1116 function to reduce stress or torque applied to the plug holder 202 which increases the service life of the plug holder 202 and/or the grow tower 150. Such multiple load cell implementations are utilized for crops that are larger or whose growth characteristics utilize complex grow tower 150 and plug holder 202 designs.

Figure 12:
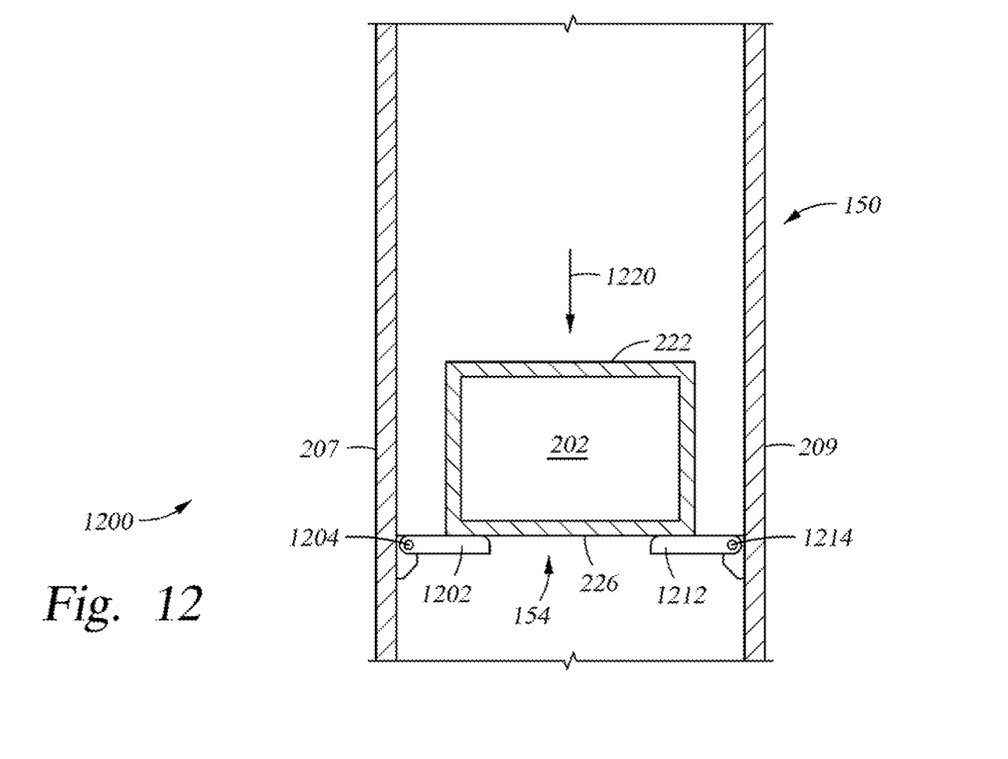
FIG. 12 illustrates a schematic, cross-sectional view of a plug holder weight measurement system according to an embodiment of the disclosure.

FIG. 12 illustrates a schematic, cross-sectional view of a plug holder weight measurement system 1200 according to an embodiment of the disclosure. The system 1200 includes the grow tower 150, the plug holder 202 disposed in the grow tower 150, and a plurality of load cells 1202, 1212 configured to measure force applied to the load cells 1202, 1212 by the plug holder 202. In one embodiment, the load cells 1202, 1212 are beam-type load cells such as those described in detail with regard to FIG. 5.

A first load cell 1202 is coupled between the plug holder 202 and the sidewall 207 of the grow tower 150. The first load cell 1202 is coupled to the sidewall 207 by a first fastener 1204, which may be similar to other fasteners described herein. In one embodiment, the first fastener 1204 is configured to fix the orientation of the first load cell 1202 relative to the sidewall 207 and provide an anchoring point of the first load cell 1202 to the sidewall 207. The first load cell 1202 extends into the volume 204 away from the sidewall 207. In one example, the first load cell 1202 is oriented substantially normal to a major axis of the sidewall 207, however, it is contemplated that the first load cell 1202 may also disposed at non-normal angles relative to the major axis of the sidewall 207. The first load cell 1202 extends a distance from the sidewall 207 into the volume 204 beyond the grow site opening 152 such that the base member 226 of the plug holder 202 is positioned on at least a portion of the first load cell 1202.

A second load cell 1212 is coupled between the plug holder 202 and the sidewall 209 of the grow tower 150. The second load cell 1212 is coupled to the sidewall 209 by a first fastener 1214, which may be similar to the fastener 1204. In one embodiment, the second fastener 1214 is configured to fix the orientation of the second load cell 1212 relative to the sidewall 209 and provide an anchoring point of the second load cell 1212 to the sidewall 209. The second load cell 1212 extends into the volume 204 away from the sidewall 209. In one example, the second load cell 1212 is oriented substantially normal to a major axis of the sidewall 209, however, it is contemplated that the second load cell 1212 may also disposed at non-normal angles relative to the major axis of the sidewall 209. In one embodiment, the second load cell 1212 is disposed parallel to the first load cell 1202. Similar to the first load cell 1202, the second load cell 1212 extends a distance from the sidewall 209 into the volume 204 beyond the grow site opening 152 such that the base member 226 of the plug holder 202 is positioned on at least a portion of the second load cell 1212.

The spacing of opposing load cells 1202, 1212 stabilizes the plug holder 202 within the volume 204 and is believed to reduce torqueing of the plug holder 202 relative to the wall 158 through which the plug holder 202 is disposed. The load cells 1202, 1212 detect directional force 1220 applied thereto which is representative of the weight of the plug holder 202 and/or the plant growing in the plug holder 202.

It is believed that by utilizing multiple load cells (e.g. load cells 1202, 1212), weight measurements are obtained with a greater degree of accuracy. For example, if the load cells 1202, 1212 detect different weight values beyond predetermined standard of error, this data may be utilized to identify potential problems with the plug holder 202 and/or the plant growing in the plug holder 202. Moreover, additional support points enabled by the utilization of multiple load cells 1202, 1212 may function to reduce stress or torque applied to the plug holder 202 which increases the service life of the plug holder 202 and/or the grow tower 150. Such multiple load cell implementations may also be utilized for crops that are larger or whose growth characteristics utilize complex grow tower 150 and plug holder 202 designs.

Figure 13:
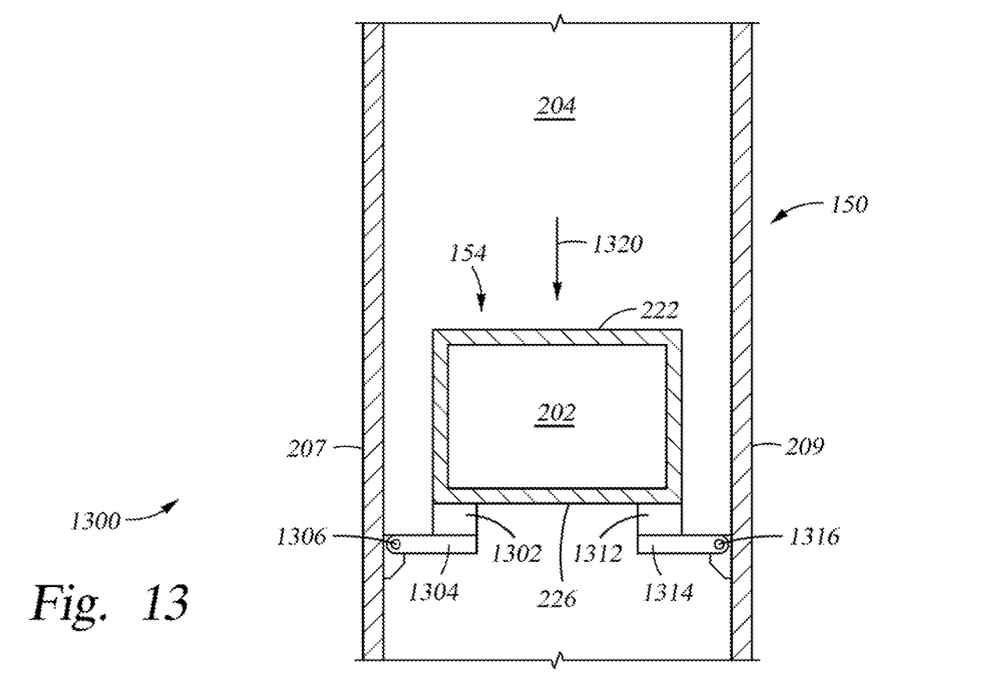
FIG. 13 illustrates a schematic, cross-sectional view of a plug holder weight measurement system according to an embodiment of the disclosure.

FIG. 13 illustrates a schematic, cross-sectional view of a plug holder weight measurement system 1300 according to an embodiment of the disclosure. The system 1300 includes the grow tower 150, the plug holder 202 disposed in the grow tower 150, and a plurality of load cells 1302, 1312 configured to measure force applied to the load cells 1302, 1312 by the plug holder 202. In one embodiment, the load cells 1302, 1312 are compression-type load cells such as those described in detail with regard to FIGS. 9 and 10.

A first support block 1304 is coupled between the sidewall 207 of the grow tower 150 and a first load cell 1302 is coupled to the first support block 1304. The first support block 1304 is coupled to the sidewall 207 by a first fastener 1306, which are similar to other fasteners described herein. In one embodiment, the first fastener 1306 is configured to fix the orientation of the first support block 1304 relative to the sidewall 207 and provide a support surface upon which the first load cell 1302 is positioned. The first support block 1304 extends into the volume 204 away from the sidewall 207. In one example, the first support block 1304 is oriented substantially normal to a major axis of the sidewall 207, however, it is contemplated that the first support block 1304 may also disposed at non-normal angles relative to the major axis of the sidewall 207. The first support block 1304 extends a distance from the sidewall 207 into the volume 204 beyond the grow site opening 152 such that the first load cell 1302, which is coupled to the first support block 1304, is coupled to at least a portion of the base member 226 of the plug holder 202.

A second support block 1314 is coupled between the sidewall 209 of the grow tower 150 and a second load cell 1312 is coupled to the second support block 1314. The second support block 1314 is coupled to the sidewall 209 by a second fastener 1316, which may be similar to the first fastener 1306. In one embodiment, the second fastener 1316 is configured to fix the orientation of the second support block 1314 relative to the sidewall 209 and provide a support surface upon which the second load cell 1312 is positioned. The second support block 1314 extends into the volume 204 away from the sidewall 209. In one example, the second support block 1314 is oriented substantially normal to a major axis of the sidewall 207, however, it is contemplated that the second support block 1314 may also disposed at non-normal angles relative to the major axis of the sidewall 207. In one example, the first support block 1304 and the second support block 1314 are disposed opposite and parallel to one another. The second support block 1314 extends a distance from the sidewall 209 into the volume 204 beyond the grow site opening 152 such that the second load cell 1312, which is coupled to the second support block 1314, is coupled to at least a portion of the base member 226 of the plug holder 202.

The spacing of opposing support blocks 1304, 1314 and load cells 1302, 1312 stabilizes the plug holder 202 within the volume 204 and is believed to reduce torqueing of the plug holder 202 relative to the wall 158 through which the plug holder 202 is disposed. The load cells 1302, 1312 detect directional force 1320 applied thereto which is representative of the weight of the plug holder 202 and/or the plant growing in the plug holder 202. Various advantages similar to those described with regard to FIGS. 11 and 12 may be realized by utilizing the load cell arrangement of the system 1300.

In summation, load cells are utilized to measure individual plug holder weights to provide for the collection of data corresponding to plant growth characteristics. Load cell measurement of individual plug holders enables evaluation of plant growth via biomass accumulation and/or moisture saturation, for example irrigation of growth media. Moreover, known weights associated with plant growth or irrigation processes are utilized to generate a profile and then compare the profile with real time results during a plant growth cycle. Because the grow tower may house dozens or hundreds of plug holders and plants, high resolution data with improved granularity may be obtained in accordance with the embodiments described herein.

For example, in a grow tower with multiple grow sites and each site includes plug holder with a plant, an irrigation process may be performed. The weights of plug holders and plants at the top of the grow tower may be compared with the weights of plug holders and plants at the bottom of the grow tower. Differences in weight may correlate to insufficient irrigation at the lower grow sites or excessive irrigation at the upper grow sites. Although this is just one example, various other control processes may be monitored by utilizing weight data from plug holders and plants obtained from load cells.

The load cells also enable realization of diminishing return on plant spacing with the grow towers due to correlation of plant size with weight measurements detected by the load cells on a per plant basis. For example, a plant of a certain weight is correlated with a canopy size of that plant. In grow towers with fixed grow sites, the weight of the grow tower may be utilized to determine a spacing profile between adjacent plants. When a weight measured by a load cell determines that spacing is limited, improved decisions are enabled with regard to continued growth of the plants or harvesting of the plants. It is contemplated that various additional benefits not specifically recited may also be achieved by implementation of the embodiments described herein.

While the foregoing is directed to embodiments of the present disclosure, other and further embodiments of the disclosure may be devised without departing from the basic scope thereof, and the scope thereof is determined by the claims that follow.

What is claimed is:

1. A plug holder weight measurement apparatus, comprising:
   a grow tower defining a volume therein;
   an opening formed in a first wall of the grow tower;
   a plug holder disposed within the opening and extending into the volume; and
   a beam load cell coupled to the first wall adjacent to the opening.

2. The apparatus of claim 1, wherein a base member of the plug holder is coupled to the load cell.

3. The apparatus of claim 1, wherein the load cell is coupled to the first wall by a first fastener.

4. The apparatus of claim 3, further comprising:
   a bracket coupled between the first wall and the load cell within the volume.

5. The apparatus of claim 4, wherein the bracket is coupled to the load cell in a fixed orientation by a second fastener.

6. The apparatus of claim 1, wherein the load cell is a hydraulic type load cell, a pneumatic type load cell, a piezoelectric type load cell, or strain gauge type load cell.

7. The apparatus of claim 1, wherein the plug holder is disposed at a non-normal angle relative to a major axis of the first wall.

8. A plug holder weight measurement apparatus, comprising:
- a grow tower defining a volume therein;
- an opening formed in a first wall of the grow tower;
- a plug holder disposed within the opening and extending into the volume; and
- a tension load cell coupled between the first wall and the plug holder within the volume.

9. The apparatus of claim 8, further comprising:
- a first connector coupled between the first wall and the load cell; and
- a second connector coupled between the load cell and the plug holder.

10. The apparatus of claim 9, wherein the second connector is coupled to a base member of the plug holder.

11. The apparatus of claim 8, further comprising:
- a support plate coupled to the first wall, wherein the plug holder is disposed on the support plate and the load cell is coupled between the support plate and the first wall.

12. The apparatus of claim 11, further comprising:
- a first connector coupled between the first wall and the load cell; and
- a second connector coupled between the load cell and the support plate.

13. The apparatus of claim 8, wherein the load cell is a hydraulic load cell, a pneumatic load cell, a piezoelectric load cell, or strain gauge load cell.

14. The apparatus of claim 8, wherein the load cell is an S-tension load cell, a tension link load cell, a canister tension load cell, or pancake tension load cell.

15. The apparatus of claim 1, wherein the plug holder is disposed at a non-normal angle relative to a major axis of the first wall.

16. A plug holder weight measurement apparatus, comprising:
- a grow tower defining a volume therein;
- an opening formed in a first wall of the grow tower;
- a plug holder disposed within the opening and extending into the volume; and
- a tension load cell coupled between the first wall and the plug holder outside of the volume.

17. The apparatus of claim 16, further comprising:
- a first connector coupled between the first wall and the load cell; and
- a second connector coupled between the load cell and the plug holder.

18. The apparatus of claim 17, wherein the second connector is coupled to a top surface of the plug holder.

19. The apparatus of claim 16, further comprising:
- a support plate coupled to the first wall, wherein the plug holder is disposed on the support plate.

20. The apparatus of claim 16, wherein the plug holder is disposed at a non-normal angle relative to a major axis of the first wall.

* * * * *